United States Patent [19]

Ohki et al.

[11] Patent Number: 4,751,899
[45] Date of Patent: Jun. 21, 1988

[54] TWO-CYCLE ENGINE

[75] Inventors: Kenzi Ohki; Toshiro Kawai, both of Asaka; Yasuhiko Nakano, Fujimi, all of Japan

[73] Assignee: Honda Giken Kogyo Kabushiki Kaisha, Japan

[21] Appl. No.: 50,949

[22] Filed: May 15, 1987

[30] Foreign Application Priority Data

May 20, 1986 [JP] Japan ................. 61-115685
May 20, 1986 [JP] Japan ................. 61-115686
May 28, 1986 [JP] Japan ................. 61-122439

[51] Int. Cl.$^4$ ............................................. F02B 75/02
[52] U.S. Cl. ................. 123/65 PE; 123/323
[58] Field of Search ............ 123/65 PE, 65 V, 65 P, 123/65 R, 323

[56] References Cited

U.S. PATENT DOCUMENTS

| | | | |
|---|---|---|---|
| 4,285,311 | 8/1981 | Iio | 123/323 |
| 4,364,346 | 12/1982 | Shiohara | 123/65 PE |
| 4,399,788 | 8/1983 | Bostelmann | 123/65 PE |
| 4,672,925 | 6/1987 | Miyata et al. | 123/65 V |

Primary Examiner—Willis R. Wolfe
Assistant Examiner—David A. Okonsky
Attorney, Agent, or Firm—Darby & Darby

[57] ABSTRACT

A two-cycle engine includes a port timing control device for varying a timing of the opening of an exhaust port. The port timing control device include a valve member having an end face curved along a cylinder, the valve member being angularly movable in a direction of the axis of the cylinder between an extended position where the valve member is extended into an exhaust passage with the end face closing an upper portion of the exhaust port and a retracted position where the valve member is retracted from the exhaust passage and fully received in a recess formed in an upper wall of the exhaust passage, with the end case opening the upper end portion of the exhaust port. The end face of the valve member is complementary in shape to an end face of the recess. The valve member has a wedge-shaped projection formed on a lower portion of the end face of the valve member and is reducing in thickness progressively toward the cylinder, so that the end face of the valve member has an upper surface and a lower surface extending from a lower end of the upper surface in slanting relation thereto toward the cylinder. The upper surface is held in sliding and sealing contact with an upper portion of the end face of the recess complementary in shape to the upper surface of the end face of the valve member.

7 Claims, 8 Drawing Sheets

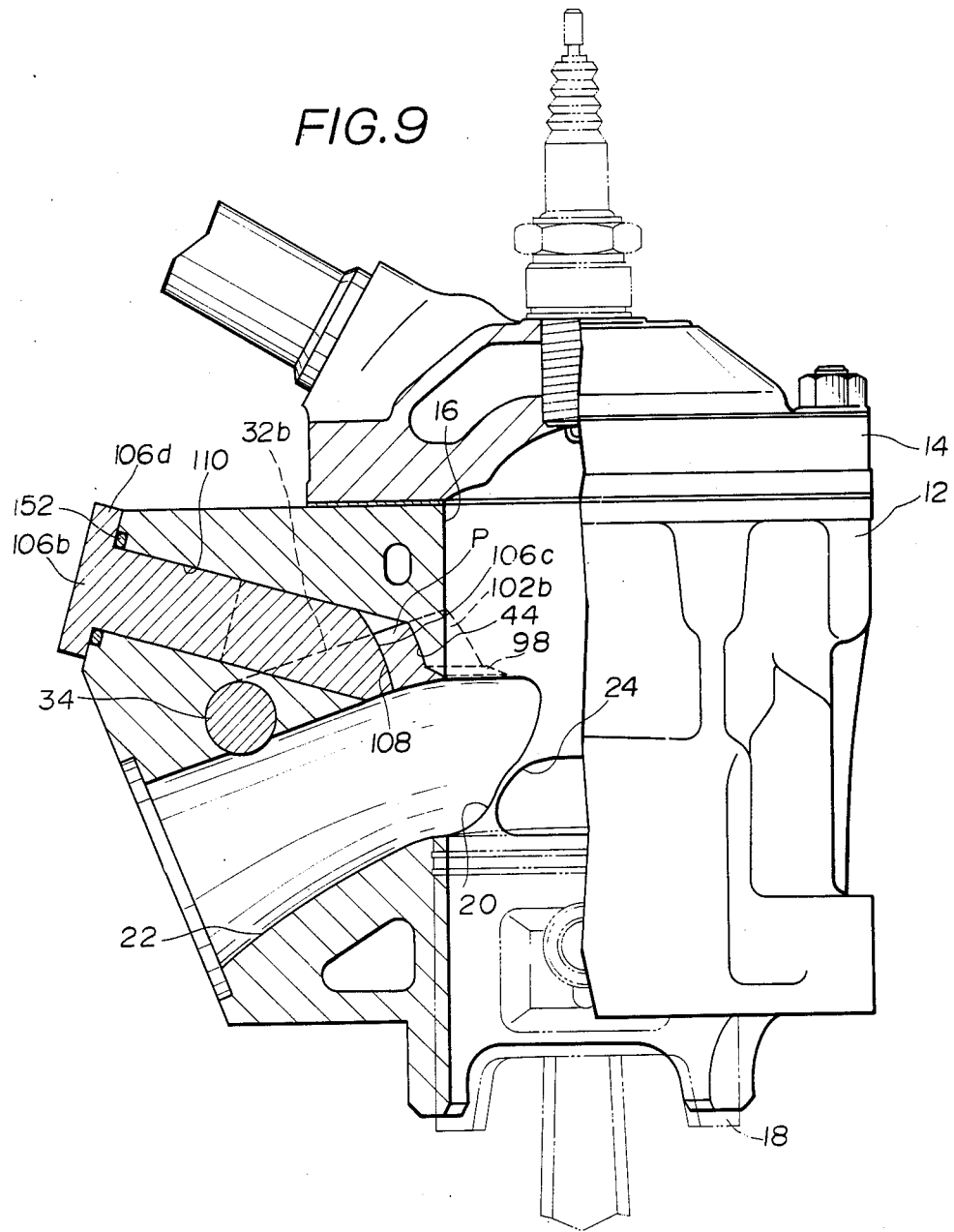

TWO-CYCLE ENGINE

BACKGROUND OF THE INVENTION

1. Field of the Invention

This invention relates generally to two-cycle engines and more particularly to two-cycle engines with means for varying an exhaust port timing in accordance with the engine speed.

2. Prior Art

Generally, engines for vehicles or the like are broadly classified into two types, that is, a low engine speed type designed to achieve good power characteristics at a lower engine speed and a high engine speed type designed to have good power characteristics at a higher engine speed. An engine of the former type achieves the maximum power output in a lower range of the engine speed whereas an engine of the latter type achieves the maximum power output in a higher engine speed. The low speed-type engine fails to output a sufficient power in the higher engine speed range while the high speed-type engine produces a less power output in the lower engine speed range in comparison with the low speed-type. In view of these, it has been proposed to increase the power output in the low engine speed-range without sacrifice of the power output in the high engine speed range, thereby achieving good power output over a wider range of the engine speed. One method of achieving this is to control or vary an exhaust port timing in accordance with the engine speed.

In two-cycle engines, an exhaust port is opened when a piston is moved along a cylinder downwardly, that is, toward its bottom dead center, so that the combustion chamber is communicated with an exhaust passage, thereby discharging the exhaust gas from the combustion chamber. In order to vary the exhaust port timing, it is necessary to vary an effective upper edge of the exhaust port. One example of such two-cycle engines is disclosed in U.S. Pat. No. 4,391,234 and is shown in FIG. 1. More specifically, a recess 130 is formed in an upper wall of an exhaust passage 122 leading to an exhaust port 120 formed in a side wall of a cylinder 116. A drive shaft 134 is disposed at one end of the recess 130 remote from the exhaust port 120 for angular movement about an axis thereof, the drive shaft 134 being disposed substantially perpendicular to both the axis of the cylinder 120 and the axis of the exhaust passage 122. A plate-like valve member 132 is fixedly mounted at one end on the drive shaft 134 so that the valve member 132 is angularly movable about the drive shaft. An end face 132a of the valve member 132 remote from the drive shaft 134 serves as a port timing control surface. The valve member 132 is angularly movable between an open or retracted position where the valve member is received in the recess 134 to open an upper portion of the exhaust port 120 and a closed or extended position where the valve member is extended into the exhaust passage 122 with the control surface 132a closing the upper end of the exhaust port 120, thereby lowering the effective upper edge of the exhaust port to the lower edge of the control surface 132a to delay the exhaust port timing. When the valve member 132 is angularly moved between its open and closed positions, the control surface 132a is moved in an arcuate path. It is necessary that in the closed position of the valve member 132, the control surface 132a should be as close to the inner peripheral surface of the cylinder 116 as possible so as to prevent the combustion gas from leaking between the upper edge of the exhaust port 120 and the control surface 132a of the valve member 132. For this reason, a wall portion 148 defined by the inner peripheral surface of the cylinder 116 and the end face 130a of the recess 130 remote from the drive shaft 134 is thinned into an edge-like shape. This edge-like wall portion 148 has a lowered ability of heat dissipation. Since the edge-like wall portion 148 is disposed at a position where the most elevated temperature develops during the operation of the engine, it has been desired to overcome this problem.

It is considered that in order to overcome the heat dissipation problem, the valve member 132 is thinned, and the recess 130 is correspondingly shallow so that the edge-like wall portion 148 is reduced. With this method, however, when the valve member 132 is brought into its closed or extended position, the thin control surface 132a is completely out of the recess 130, so that there is provided a dead space formed between the recess 130 and the upper surface of the valve member 132. This dead space is in communication with the combustion chamber, and therefore before the exhaust port 120 is opened, part of the exhaust gas flows into the dead space. This would affect the port timing control.

SUMMARY OF THE INVENTION

It is therefore an object of this invention to provide a two-cycle engine with an exhaust port timing control means in which a wall portion of the cylinder block disposed immediately adjacent to the upper edge of the exhaust port is capable of effecting a heat dissipation efficiently.

According to the present invention, there is provided a two-cycle engine comprising:

(a) a cylinder block including a cylinder having an axis, and an exhaust port formed in a peripheral side surface of the cylinder, the exhaust port having upper and lower edges spaced from each other along the axis of the cylinder, the cylinder block having an exhaust passage communicating with the exhaust port, a recess being formed in the cylinder block and opening to the exhaust passage, the recess having a first end face disposed adjacent to said upper edge of said exhaust port;

(b) a piston received in the cylinder for reciprocal movement therealong so as to close and open the exhaust port; and (d) a port timing control means for varying a timing of the opening of the exhaust port by the piston, the port timing control means comprising a valve member having a second end face curved along the peripheral wall, the valve member being angularly movable in a direction of the axis of the cylinder between an extended position where the valve member is extended into the exhaust passage with the second end face closing an upper portion of the exhaust port and a retracted position where the valve member is retracted from the exhaust passage and fully received in the recess with the second end face opening the upper end portion of the exhaust port, the second end face being complementary in shape to the first end face, the valve member having a wedge-shaped projection formed on a lower portion of the second end face and reducing in thickness progressively toward the cylinder, so that the second end face has an upper surface and a lower surface extending from a lower end of the upper surface in slanting relation thereto toward the cylinder, the upper surface being held in sliding and sealing contact with an upper portion of the first end face complementary in shape to the upper surface of the second end face.

DETAILED DESCRIPTION OF THE DRAWINGS

FIG. 9 is a partly cross-sectional side elevational view, the cross-section being taken along the line IX—IX of FIG. FIG. 8.

DESCRIPTION OF THE PREFERRED EMBODIMENTS OF THE INVENTION

Figure 1:
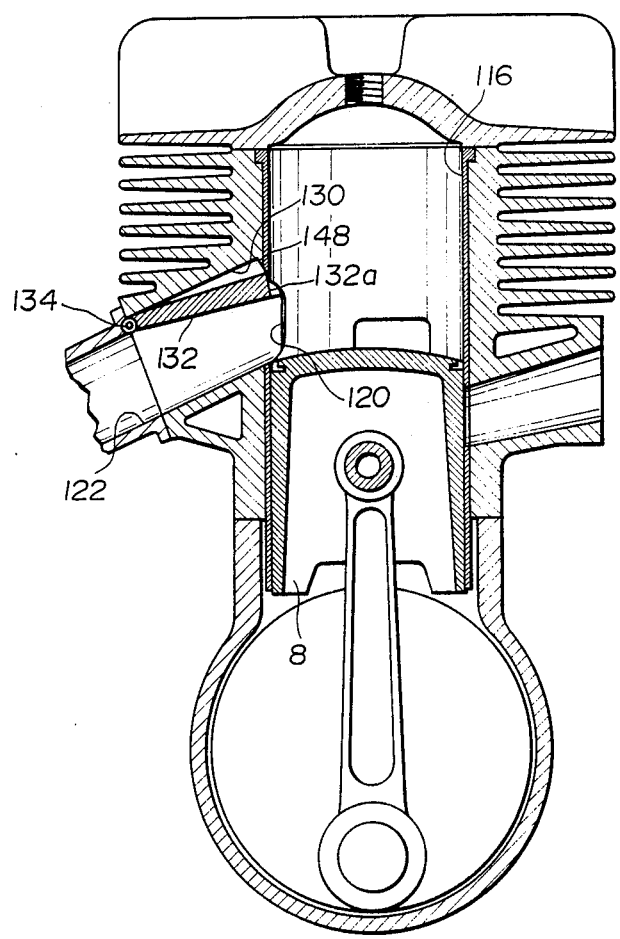
FIG. 1 is a cross-sectional view of a two-cycle engine provided in accordance with the prior art.

The invention will now be described with reference to the drawings in which like reference numerals denote corresponding parts in several views.

Figure 2:
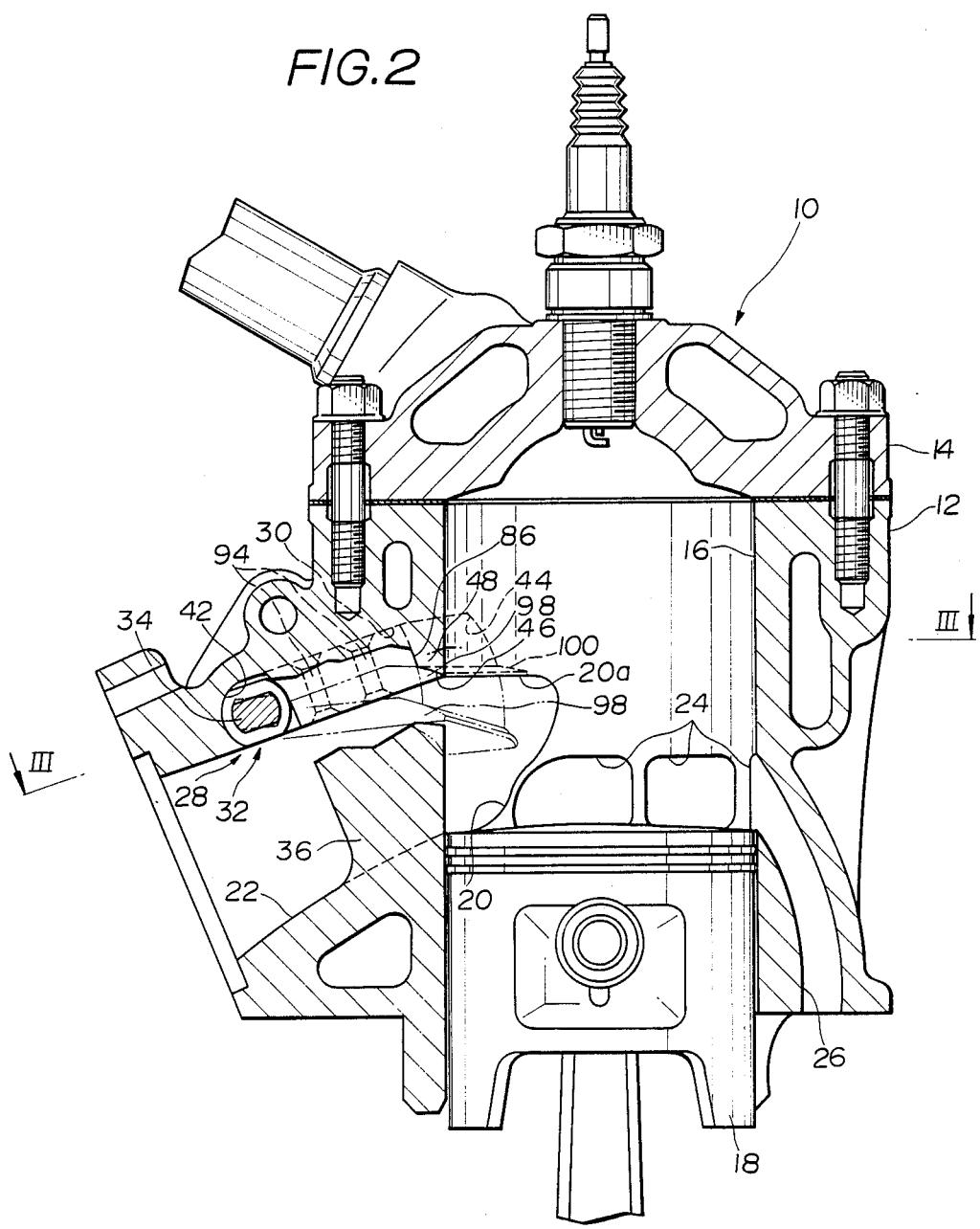
FIG. 2 is a cross-sectional view of a portion of a two-cycle engine provided in accordance with the present invention.

FIG. 2 shows a portion of a two-cycle internal combustion engine 10 which comprises a cylinder block 12 having a cylinder head 14 thereon, the block having a cylinder 16. A piston 18 is received in the cylinder 16 for reciprocal movement therealong. An exhaust port 20 is formed in a side or peripheral wall of the cylinder 16 and has upper and lower edges spaced along the axis of the cylinder 16. An exhaust passage 22 is formed in the cylinder block 12 and opens to the exhaust port 20 at one end thereof. A plurality of scavenge ports 24 are formed in the peripheral wall of the cylinder 16 in circumferentially spaced relation and communicates with a crankcase chamber (not shown) through respective scavenge passages 26 as is well known in the art. The exhaust port 20 and the scavenge ports 24 are opened and closed by the peripheral surface of the piston 18 moving along the cylinder 16 as is well known in the art.

Port timing control means 28 is provided for varying an exhaust port timing, that is, a timing of the opening of the exhaust port 20 by the piston 18. A recess 30 is formed in an upper wall of the exhaust passage 22 adjacent to the exhaust port 20. The port timing control means 28 comprises a valve member 32 fixedly mounted at one end on a drive shaft 34 disposed at an outer end 42 of the recess 30 remote from the exhaust port 20, so that upon angular movement of the drive shaft 34 about its axis, the valve member 32 is angularly movable together with the drive shaft 34 so as to close an upper portion of the exhaust port 20 to vary the exhaust port timing of the engine 10. The drive shaft 34 is disposed substantially perpendicular to the axis of the cylinder 16.

A partition wall 36 is provided in the exhaust passage 22 adjacent to the exhaust port 20 and extends along the axis of the cylinder 16 so as to divide the exhaust port 20 into two halves juxtaposed circumferentially of the cylinder 16. Also, the inner portion of the exhaust passage 22 disposed adjacent to the exhaust port 20 is divided by the partition wall 36 into two halves.

Figure 3:
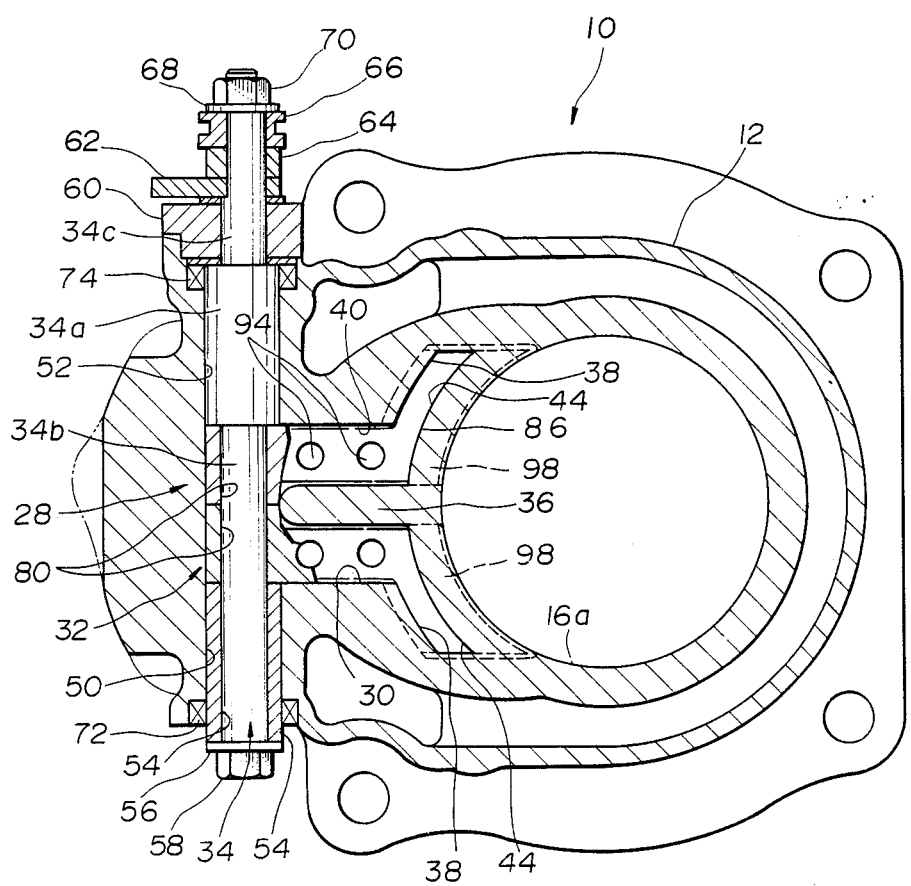
FIG. 3 is a cross-sectional view taken along the line III—III of FIG. 2.

As best shown in FIG. 3, the recess 30 has a first portion 38 of an arcuate cross-section divided by the partition wall 36 into two halves juxtaposed circumferentially of the cylinder 16. The first portion 38 is disposed immediately adjacent to the exhaust port 20. The recess 30 also has a second portion 40 of a rectangular cross-section extending from the first portion 38 in a direction away from the exhaust port 20. The second portion 40 is divided by the partition wall 36 into two halves juxtaposed circumferentially of the cylinder, except for its outer end portion 42 remote from the exhaust port 20. The first portion 38 of the recess 30 is slightly greater in width than the exhaust port 20. An inner end face of the recess 30 disposed adjacent to the inner peripheral surface of the cylinder and extending therealong is stepped along the axis of the cylinder 16 and is defined by an upper surface 44 and a lower surface 46 extending from the upper surface 44 to the upper edge 20a of the exhaust port 20. As shown in FIG. 2, the upper surface 44 is concavely arcuate and disposed on a circle having a center lying on the axis of rotation of the drive shaft 34. The upper surface 44 of the recess 30 is spaced from the inner peripheral surface of the cylinder 16 by such a distance that a wall portion 48 of the cylinder block 12 defined by the inner peripheral surface of the cylinder 16 and the end face of the recess 30 (i,e., the upper and lower surfaces 44 and 46) is relatively thick so as to achieve a good heat dissipation.

A pair of aligned first and second holes 50 and 52 are formed through the cylinder block 12 on opposite sides of the outer end portion 42 of the recess 30, the first and second holes 50 and 52 being continuous with the outer end portion 42. The drive shaft 34 has a cylindrical portion 34a, a mounting portion 34b of a non-circular cross-section extending from one end of the cylindrical portion 34a, and a reduced-diameter portion 34c extending from the other end of the cylindrical portion 34a. A sleeve 54 is received in the first hole 50 for angular movement about its axis, the sleeve having an internal bore 54a of a non-circular cross-section substantially complementary to that of the mounting portion 34b. The cylindrical portion 34a of the drive shaft 34 is received in the second hole 52 for angular movement about its axis, and the mounting portion 34b is fitted in the internal bore 54a of the sleeve 54. The valve member 32 is mounted on that portion of the mounting portion 34a lying between the cylindrical portion 34a and the sleeve 54 and disposed in the outer end portion 42 of the recess 30.

The mounting portion 34b of the drive shaft 34 has a threaded free end on which a retainer ring 56 is fitted, and a nut 58 is threaded on the threaded free end of the mounting portion 34b to hold the retainer ring 56 against an outer end of the sleeve 54, thereby holding the sleeve 54 from disengagement from the mounting portion 34b. A retainer 60, an operating lever 62, collars 64 and 66 and a retainer ring 68 are mounted on the reduced-diameter portion 34c of the drive shaft 34, and a nut 70 is threaded on a threaded free end of the reduced-diameter portion 34c to hold these members 60, 62, 64, 66 and 68 in position. The reduced-diameter portion 34c is angularly movable relative to the retainer 60 but is angularly movable with the operating lever 62, the collars 64 and 66 and the retainer ring 68. First and second seal rings 72 and 74 are mounted on the cylinder block 12 and disposed at the outer ends of the first and second mounting holes 50 and 52, respectively. The first and second seal rings 72 and 74 sealingly surround the sleeve 54 and the cylindrical portion 34a, respectively.

Figure 4:
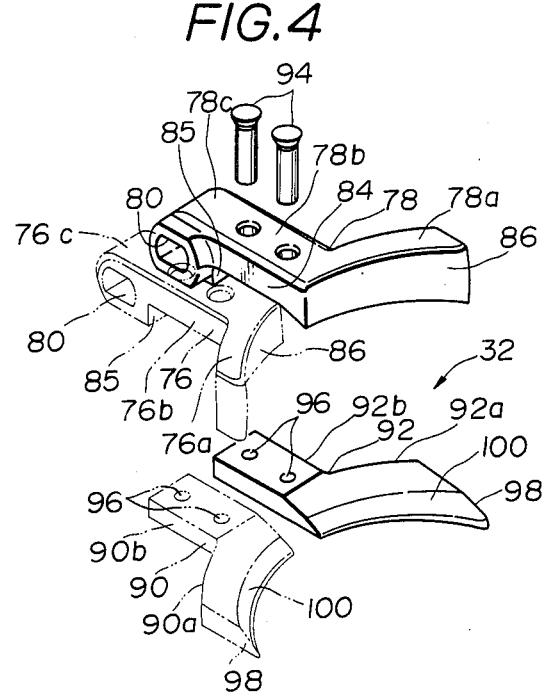
FIG. 4 is an exploded view of a valve member.
Figure 5:
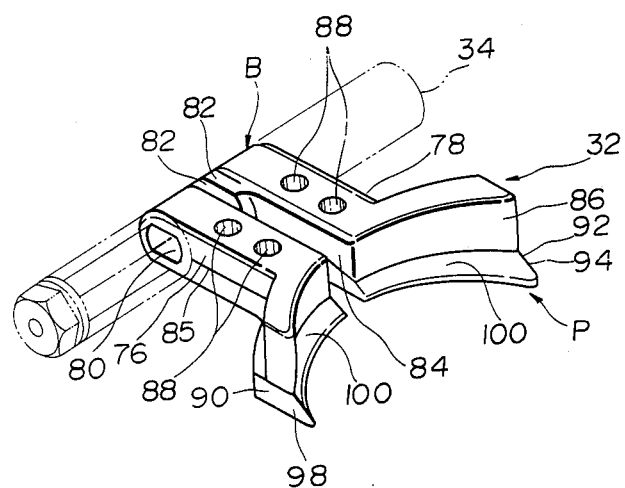
FIG. 5 is a perspective view of the valve member.

As best shown in FIGS. 4 and 5, the valve member 32 is of the split-type and comprises two halves disposed symmetrically with respect to the plane of the partition wall 36. More specifically, the valve member 32 comprises first and second upper elements 76 and 78 of a generally L-shape each having a first arcuate leg 76a (78a) and a second straight leg 76b (78b) extending from one end of the first leg. A hole 80 is formed through one end 76c (78c) of the second leg 76b (78b) remote from the first leg, the hole 80 having a non-circular cross-section which is complementary to the non-circular cross-section of the mounting portion 34b of the drive shaft 34. The one ends 76c and 78c of the second legs 76b and 78b are received in the outer end portion 42 of the recess 30, and the mounting portion 34b of the drive shaft 34 passes through the aligned holes 80 of the second legs 76b and 78b. The one ends 76c and 78c are interposed between the cylindrical portion 34a of the drive shaft 34 and the sleeve 54. Thus, the first and second elements 76 and 78 are fixedly mounted on the drive shaft 34 for angular movement therewith. The opposed flat side faces of the second legs 76b and 78b are raised at their ends 76c and 78c to provide respective annular projections 82. The annular projections 82 are held against each other, so that the first and second upper elements 76 and 78 are spaced from each other except for the projections 82 so as to provide a slot 84 therebetween. The partition wall 36 is fitted in the slot 84. Also, a depression 85 is formed in the lower face of each of the first and second upper elements 76 and 78.

The first arcuate legs 76a and 78a extend along the inner peripheral surface of the cylinder 16 and spaced by the slot 84. A front or inner face 86 of each of the first legs 76a and 78a disposed adjacent to the cylinder 16 are complementary in shape to the upper surface 44 of the inner end face of the recess 30. Two apertures 88 are formed through the second leg 76b (78b) of each of the first and second upper elements 76 and 78 and extend between the upper and lower faces thereof.

The valve member 32 further comprises first and second lower elements 90 and 92 received in the depressions 85 of the first and second upper elements 76 and 78 and secured thereto by rivets 94 passing through the apertures 88 of the upper elements 76 and 78 and apertures 96 formed through the first and second lower elements 90 and 92. The first and second lower elements 88 are generally similar in shape to the first and second upper elements 76 and 78, respectively. The first and second lower elements 90 and 92 are disposed symmetrically with respect to the plane of the partition wall 36. More specifically, each of the first and second lower elements 90 and 92 has a first arcuate leg 90a (92a) and a second straight leg 90b (92b) extending from one end of the first leg. The first arcuate legs 90a and 92a extend along the inner peripheral surface 16a of the cylinder 16. The upper faces of first and second lower elements 90 and 92 are mated with the lower faces of the first and second upper elements 76 and 78, respectively, with their respective inner or front ends 98 of a wedge-shaped cross-section projecting beyond the inner faces 86 of the upper elements 76 and 78 toward the cylinder 16, the thickness of the inner ends 98 decreasing progressively toward the cylinder 16. Therefore, inner end faces 100 of the lower elements 90 and 92 extend downwardly from the lower ends or edges of the inner end faces 86 of the upper elements 76 and 78, respectively, toward the cylinder 16 in slanting relation to the inner end faces 86. The inner end faces 100 of the lower elements 90 and 92 are tapering toward the axis of the cylinder 16. Thus, in other words, the wedge-shaped inner ends 98 of the lower elements 90 and 92 provide an interrupted arcuate projection provided on the lower portion of the inner end face of the valve member 32. The valve member 32 has a port control portion P constituted by the mated first legs 76a and 90a of the first upper and lower elements 76 and 90 and the mated first legs 78a and 92a of the second upper and lower elements 78 and 92, and a base portion B constituted by the mated second legs 76b and 90b and the mated second legs 78b and 92b (FIG. 5).

The valve member 32 is complementary in shape to the recess 30, and when the valve member 32 is in its retracted or open position, that is, is fully received in the recess 30, the lower surface of the valve member 32 is substantially continuous with the wall of the exhaust passage 26. The inner faces 86 of the first and second upper elements 76 and 78 are held in sliding contact with the upper surface 44 of the end face of the recess 30. An angle of angular movement of the valve member 32 is so determined that the inner faces 86 do not become disengaged from the upper surfaces 44 when the valve member 32 is extended into the exhaust passage 22. Thus, the inner faces 86 serve as sealing surfaces for preventing the exhaust gas from intruding into a space formed by the upper surface of the valve member 32 and the wall of the recess 30. When the valve member 32 is fully received in the recess 30, that is, in its retracted or open position, the inner end faces 100 of the first and second lower elements 90 and 92 are held in contact with the lower surface 46 of the end face of the recess 30. In the extended or closed position of the valve member 32, the inner end face of the valve member 32 close the upper portion of the exhaust port 20.

The drive shaft 34 is operatively connected through the operating lever 62 to an actuator (not shown) which is operable to move the valve member 32 between its open and closed positions. For example, such an actuator is a centrifugal governor, a servomotor or the like which is operated in accordance with the engine speed.

In operation, in a lower range of the engine speed, the valve member 32 is held in its extended or closed position where the inner end face of the valve member 32 close the upper portion of the exhaust port 20 to delay the opening of the exhaust port 20, thereby providing improved output power of the engine. When the engine speed reaches a predetermined level, the actuator is operated to angularly move the valve member 32 from its extended to retracted position through the drive shaft 34, thereby fully opening the exhaust port 20. Thus, the engine produces improved power output over a wider range of the engine speed.

With the unique configuration of the valve member 32, the thickness of the wall portion 48 lying between the inner peripheral surface of the cylinder 16 and the upper surface 44 of the end face of the recess 30 is increased so as to provide for a good heat dissipation. Therefore, the heat of the exhaust gas is relatively rapidly transferred through the wall portion 48 to the remainder of the cylinder block 12, so that the wall portion 48 which is subjected to extremely high temperatures is not unduly heated. In addition, since the wedge-shaped inner ends 98 of the lower elements 90 and 92 increases in thickness in a direction away from the cylinder 16, the valve member 32 also effect a heat transfer efficiently and hence is not unduly heated. Further, since the valve member 32 comprises the individual upper and lower elements 76, 78, 90 and 92 joined together, the inner end faces or sealing surfaces 86 of the upper elements 76 and 78 as well as the the inner end faces 100 of the lower elements 90 and 92 can be machined with a high dimensional accuracy. This enhances the sealing effect and enables a reliable port timing control operation.

When the valve member 32 is in its extended position, the front end face of the valve member 32 and the lower surface 46 of the recess end face define a space in communication with the combustion chamber. However, this space is quite small in comparison with the combustion chamber and therefore does not substantially affect the exhaust port timing control.

Figure 6:
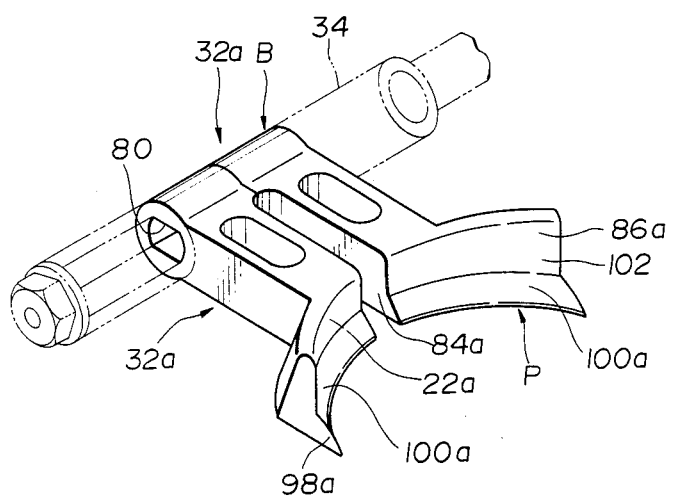
FIG. 6 is a perspective view of a modified valve member.

FIG. 6 shows a modified valve member 32a which differs from the valve member 32 of the preceding embodiment in that two halves of the valve member 32a each corresponding to the mating upper element 76 (78) and lower element 90 (92) joined together is of a unitary or one-piece construction. More specifically, the valve member 32a has an inner end face 102 which is interrupted by a slot 84a and extending along the inner peripheral surface 16a of the cylinder 16. The valve member 32a has an arcuate projection 98a of a wedge-shape cross-section formed on a lower portion of the inner end face 102 and extending therealong, the wedge-shaped projection 98a decreasing in thickness progressively toward the cylinder 16, so that the inner end face 102 is stepped and defined by an upper sealing surface 86a and a lower surface 100a extending from the lower end of the upper sealing surface 86a toward the cylinder 16 in slanting relation to the sealing surface 86a. The inner end face 102 of the valve member 32a is complementary in shape to the inner end face of the recess 30. More specifically, the upper sealing surface 86a and lower surface 100a of the inner end face 102 are complementary in shape to the upper surface 44 and lower surface 46 of the inner end face of the recess 30, respectively, as described above in the preceding embodiment. The lower surface 100a of the inner end face 102 is tapering toward the axis of the cylinder 16.

Figure 7:
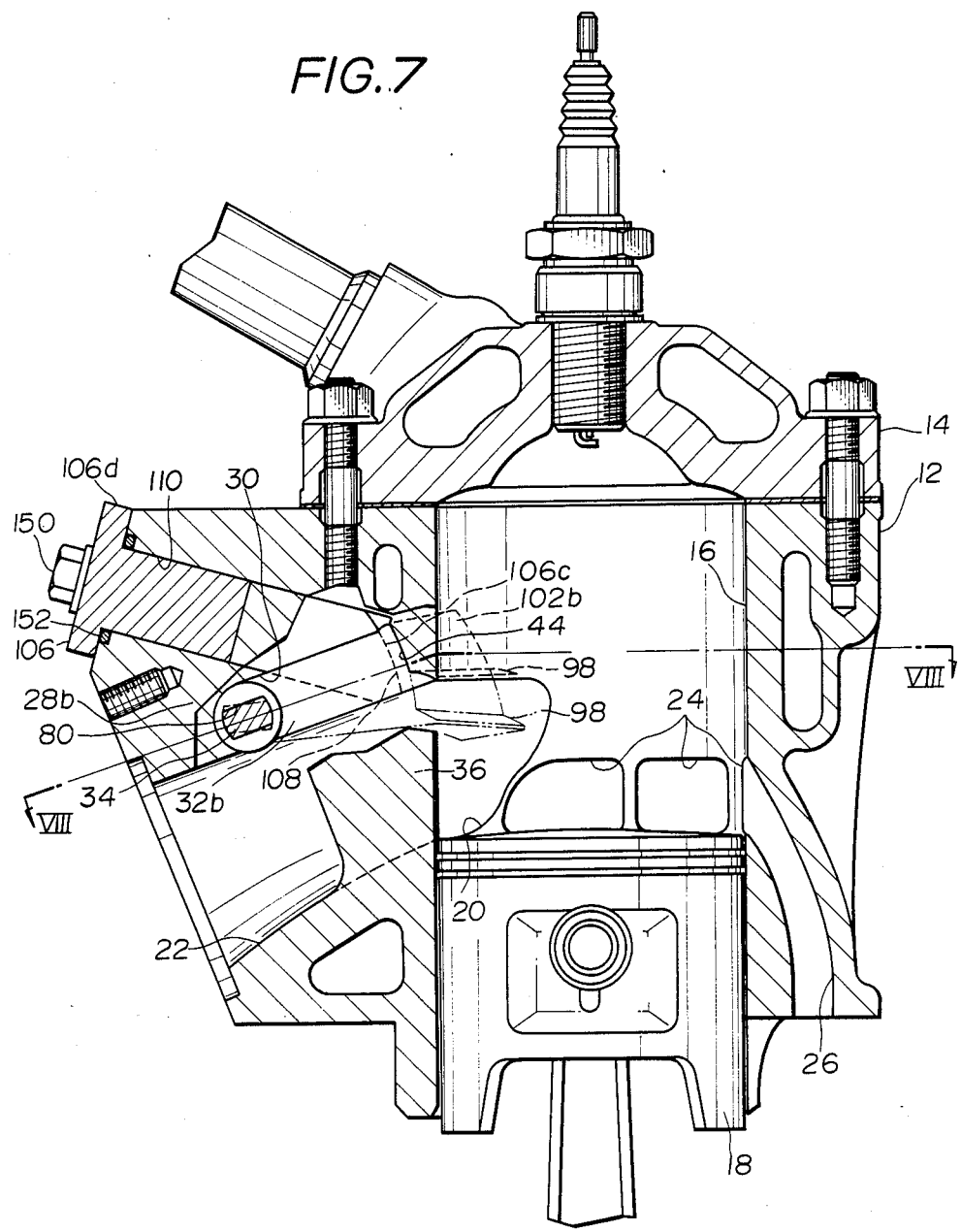
FIG. 7 is a view similar to FIG. 2 but showing a modified form of the invention.
Figure 8:
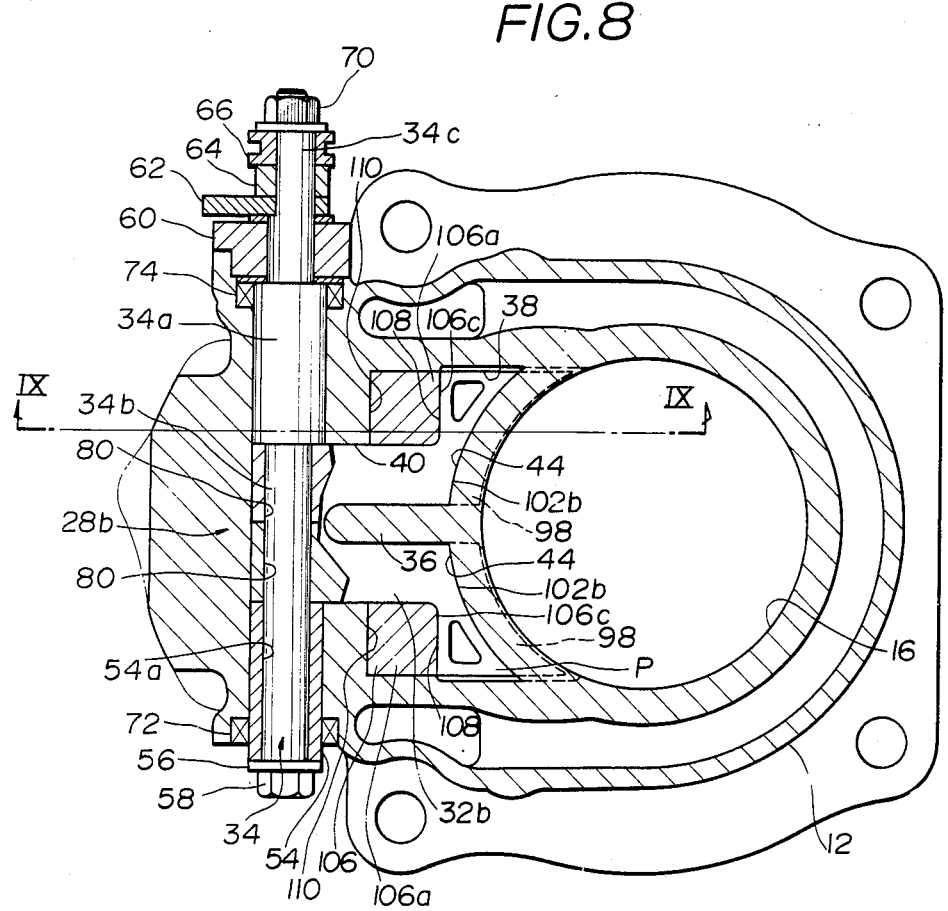
FIG. 8 is a cross-sectional view taken along the line VIII—VIII of FIG. 7.

FIGS. 7 to 9 shows another modified port timing control means 28b which differs from the port timing control means 28 of FIGS. 1 to 5 mainly in that a sealing member 106 is provided for enhancing a sealing between a valve member 32b and the cylinder block 12. More specifically, the valve member 32b is composed of two halves of a unitary construction as is the case with the base member 32a of FIG. 6. A rear face 108 of the port control portion P facing away from an inner end face 102b of the valve member 32b is concavely arcuate or semi-cylindrical and disposed on a circle having a center lying on the axis of the drive shaft 34. The sealing member 106 is of a U-shape defined by a pair of parallel spaced arms 106a and a connecting portion 106b interconnecting the two arms 106a at their one ends. A pair of parallel spaced guide holes 110 are formed in the cylinder block 12, the guide holes 110 extending to the exhaust passage 22. The parallel guide holes 110 communicate at their inner ends with a first portion 38 of the recess 30 in which the port control portion P of the valve member 32c is received, as described above for the preceding embodiments. The two arms 106a are snugly fitted in the two guide holes 110, respectively.

The inner end faces 106c of the arms 106a of the sealing member 106 are complementary in shape to the rear face 108 of the port control portion P of the valve member and are held in sliding and sealing contact therewith. The sealing member 106 has a flange 106d at its outer end, and upon inserting the arms 106a into the guide holes 110, the flange 106d is brought into engagement with the outer surface of the cylinder block 12, so that the sealing member 106 can be mounted on the cylinder block 12 in proper position. The sealing member 106 is held in position by bolts 150 passing through the sealing member 106 into the cylinder block 12. A seal ring 152 is fitted around each arm 106a of the sealing member 106 and is disposed at the outer end of each guide hole 110. The inner end face or sealing surface 102b of the valve member 32b is held in sealing contact as described above for the preceding embodiment, and besides the inner end faces 106c of the two arms 106a of the sealing member 106 are held in sealing contact with the rear face 108 of the port control portion P. Therefore, a leakage of the exhaust gas into the recess 30 is positively prevented. In this embodiment, although the separate sealing member 106 is to provide the sealing surfaces 106c with which the rear face 108 of the port control portion is held in sliding contact, the use of the separate sealing member 106 may be omitted in which case the recess 30 is modified so as to provide a sealing surface complementary in shape to the rear face 108 to achieve the same sealing effects. The concavely semi-cylindrical rear face 108 and the semi-cylindrical sealing surfaces 106c are simple in configuration and can be relatively easily machined.

What is claimed is:
1. A two-cycle engine comprising:
(a) a cylinder block including a cylinder having an axis, and an exhaust port formed in a peripheral side surface of said cylinder, said exhaust port having upper and lower edges spaced from each other along the axis of said cylinder, said cylinder block having an exhaust passage communicating with said exhaust port, a recess being formed in said cylinder block and opening to said exhaust passage, said recess having a first end face disposed adjacent to said upper edge of said exhaust port;
(b) a piston received in said cylinder for reciprocal movement therealong so as to close and open said exhaust port; and
(c) a port timing control means for varying a timing of the opening of said exhaust port by said piston, said port timing control means comprising a valve member having a second end face curved along said peripheral side surface, said valve member being angularly movable in a direction of the axis of said cylinder between an extended position where said valve member is extended into said exhaust passage with said second end face closing an upper portion of said exhaust port and a retracted position where said valve member is retracted from said exhaust passage and fully received in said recess with said second end face opening said upper portion of said exhaust port, said second end face being complementary in shape to said first end face, said valve member having a wedge-shaped projection formed on a lower portion of said second end face and reducing in thickness progressively toward said cylinder, so that said second end face has an upper surface and a lower surface extending from a lower end of said upper surface in slanting relation thereto toward said cylinder, said upper surface being held in sliding and sealing contact with an upper portion of said first end face complementary in shape to said upper surface of said second end face.

2. A two-cycle engine according to claim 1, in which said valve member comprises an upper element and a lower element joined to an underside of said upper element, said upper element having one end face serving as said upper surface of said valve member, one end of said lower element being formed into a wedge-shape and extending beyond said one end face of said upper element so as to serve as said wedge-shaped projection.

3. A two-cycle engine according to claim 1, in which said valve member comprises two halves of a unitary construction held together and juxtaposed circumferentially of said cylinder.

4. A two-cycle engine according to claim 1, in which said second end face is interrupted circumferentially of said cylinder by a slot formed in said valve.

5. A two-cycle engine according to claim 1, in which said valve member has a port control portion extending circumferentially of said cylinder and a base portion extending from said port control portion in a direction away from said cylinder, said port control portion having an inner surface serving as said second end face and a rear surface facing away from said inner surface, sealing means being provided in said cylinder block and having a sealing surface complementary in shape to said rear surface, said rear surface of said port control portion being held in sliding and sealing contact with said sealing surface.

6. A two-cycle engine according to claim 5, in which said sealing means comprises a U-shaped sealing member having a pair of parallel arms having respective inner end faces serving as said sealing surface.

7. A two-cycle engine according to claim 5, in which said rear surface is concavely semi-cylindrical and is disposed on a circle having a center on the axis of angular movement of said valve member.

* * * * *